3,343,905
NYLON DYES
James F. Feeman, Wyomissing, Pa., assignor to Crompton & Knowles Corporation, Worcester, Mass., a corporation of Massachusetts
No Drawing. Filed Oct. 20, 1966, Ser. No. 587,987
13 Claims. (Cl. 8—26)

This application discloses and claims subject matter contained in my copending applications, Ser. No. 328,051, filed Dec. 4, 1963, now Patent No. 3,305,539 and Ser. No. 378,460, filed June 26, 1964, now abandoned.

This invention relates to dyes for nylon fibers, to a method of dyeing nylon fibers and to the products produced by such process.

Dyeing of nylon in heavy depths of shade with a high order of fastness to washing is an important technical problem which has not been solved previously in a satisfactory manner.

Many available dyes which are applicable to nylon have failed to produce desirable results with respect to washing fastness of deep shades. The so-called acid dyes (see The Colour Index–Second Edition or the Annual Technical Manuals of the American Assocition of Textile Chemists & Colorists) as a class have been used extensively for nylon dyeing. However, those acid dyes which require large quantities of strong mineral acid to completely exhaust the dye from the bath are not used for dyeing nylon because the acid degrades the fiber. In general, the acid dyes which are not used for nylon have two or more solubilizing groups in the dye structure. As used hereinafter, the term "acid nylon dyes" will refer to those acid dyes which do not require the use of strong mineral acid to exhaust onto the fiber and which, therefore, are extensively used to dye nylon.

The acid nylon dyes give reasonably good results when used in light to medium percentages provided dyebath additives are used to control levelness and exhaustion rate of the dyes. However, in the high percentages necessary to provide deep shades, the acid nylon dyes are lacking in either "pile-on" capability (i.e., will not exhaust properly onto the fiber to the extent necessary to give the desired depth of shade) or in washing fastness.

Acid dyeing acid dyes (i.e., those requiring acetic or formic acid to exhaust well from the dyebath) suffer from lack of "pile-on" capability, and, while they are satisfactory with respect to staining other fibers during washing, dyeings made therewith lose color to the wash liquor during laundering procedures.

Water soluble premetallized acid dyes (e.g., complexes having a 1:1 dye:metal ratio and solubilized by means of substituent sulfonic or carboxylic groups) "pile-on" poorly, but have excellent washing fastness. The corresponding water soluble 2:1 dye:metal complexes have poor "pile-on" capability and they exhibit poorer wash fastness than the corresponding solubilized 1:1 dye:metal complexes.

The neutral dyeing 2:1 premetallized acid dyes (complexes having a 2:1 dye:metal ratio but free from substituent sulfonic or carboxylic acid groups) exhaust well giving heavy shades, but the resultant dyeings do not meet high standards with regard to washing fastness. These dyes additionally have limited water solubility which precludes their use in certain important types of dyeing machinery which employ low liquor ratios.

Neutral dyeing acid dyes have been and are now being used extensively for the production of heavy shades on nylon fibers because of their ease of application, their excellent "pile-on" capability, and the levelness of dyeings produced. Dyeings of this type, however, must be after-treated with certain materials such as tannic acid to have their washing fastness improved to acceptable levels. After-treatments of this sort are objectionable from the standpoint of both time and cost, but, until now have been the best means available to the dyer for the production of washfast heavy dyeings on nylon.

Other classes of dyes applicable to nylon are similarly unsuited to production of washfast heavy dyeings. Disperse dyes are notoriously poor to washing fastness, even though they produce level dyeings with ease and of satisfactory depth. Their washfastness is not improved by after-treatments to the same extent that is found with the neutral dyeing acid dyes. Mordant dyes may be metallized (notably chromed) on nylon by after-treatments with metal salts in acidic baths yielding dyeings of excellent fastness to washing, but the dyeing procedure is very difficult to control to the degree necessary to enable the matching of shades. Therefore, mordant dyes are used in only very specialized applications where time is no problem. Reactive dyes have thus far failed to produce the desired very heavy dyeings required; presumably, this is due to the relatively low number of amino end groups available in the nylon fiber and which are necessary for attachment of the dye molecule to the fiber.

Accordingly, it is one of the objects of this invention to provide a new group of dyes for nylon that will have an unique combination of properties in that they can be applied in deep (heavy) shades that are highly washfast and to do so without the necessity of resorting to after-treatments with conventional fastening agents.

Another object of this invention is to provide techniques for dyeing nylon fibers with acid nylon dyes in from light to deep shades and at the same time, to obtain highly washfast dyeings even in the heavy shades without the necessity of after-treating the dyeings with conventional fastening agents.

Still another object of this invention is to provide an unique textile product i.e., nylon textiles dyed with acid nylon dyes in deep shades that are highly washfast.

Other objects and advantages will appear in the description of the invention.

According to this invention, I have now discovered that surprising excellent washfastness is obtained even when dyeing nylon in heavy shades by employing dye compositions comprising at least one non-metallized, non-metallizable neutral dyeing acid nylon dye and at least a molecular equivalent of a premetallized azo 1:1 dye: chromium complex which is readily soluble in neutral and weakly alkaline solutions. In dyeing with such dye compositions, the color will build up at such a rate that the dyer has control of the exhaustion of dye and a full range of shades ranging from light to heavy depths can be obtained. Apparently, the non-metallized dye penetrates the nylon fiber first, preferably from a neutral bath, and is fixed there by the pre-metallized complex which is dyed on subsequently in the presence of acid and at elevated temperatures.

Suitable pre-metallized azo 1:1 dye-chromium complexes for use in accordance with this invention include those which are substantially free of dye-metal complexes in which the dye-metal ratio is 2:1 and which are also substantially free of unchromed dye. However, in order for the pre-metallized azo 1:1 dye-chromium complex to be useful for purposes of this invention, it must have sufficient solubility—preferably imparted by including one sulfonic group in the dye structure—so that it will dissolve readily in neutral or weakly alkaline solutions and dye onto nylon fibers from solutions having a pH of about 4 at elevated temperatures of the order of 90–125° C. By increasing the number of solubilizing sulfonics, you concurrently lower the pH at which the dye will exhaust onto nylon, and very low pH's will cause fiber degradation hence it is desirable to use solubilized complexes which will dye nylon at pH's of about 4. Premetallized azo 1:1 dye-chromium complexes having the aforesaid characteristic properties are also a well known class of dyes and heretofore, they have been extensively employed in the dyeing of wool. However, because of their poor "pile-on" capabilities, they have not been used extensively for the dyeing of nylon. The most familiar premetallized 1:1 dye-chromium complexes are the chromium dye complexes that contain one chromium atom for every o,o'-dihydroxy azo grouping. However, useful premetallized 1:1 dye-chromium complexes can be formed from any mordant dye that has groups that will chelate with trivalent chromium in positions vicinal to the azo linkage and wherein one of said vicinal groups should be —OH and the other vicinal group can be a radical such as —OH, —NH$_2$, and —COOH.

Some premetallized 1:1 dye-chromium complexes such as the 1:1 chrome complex of C. I. Mordant Black 1 (15710) do not have sufficient solubility to permit their use in the highly concentrated aqueous solutions needed for dyeing heavy shades from baths having low liquor ratios. In such cases, additional solubility can be obtained as described in my co-pending application Ser. No. 328,051 filed Dec. 4, 1963, by further complexing the premetallized dye complex with certain aliphatic carboxylic acids such as oxalic, lactic, citric, malic, saccharic, tartronic and especially with tartaric acid. The solubilized 1:1 dye-metal complexes of my co-pending application, Ser. No. 328,051, can be used in making the dye compositions of this invention.

Suitable acid dyes for use in accordance with this invention include those non-metallized and non-metallizable acid nylon dyes (i.e., acid dyes that have not been premetallized with polyvalent metals such as Cr, Co, Cu, etc. and which do not have the capability of forming dye-metal ring structures when in the presence of ions of such polyvalent metals) that are capable of dyeing nylon fibers from neutral to weakly acid dyebaths. Because of their ready availability, I prefer to use the azo and anthraquinone neutral dyeing acid nylon dyes having the aforesaid characteristics.

While all of the various types of dyes for nylon usually included in the broad class of acid dyes are improved in fastness to washing on nylon when dyed simultaneously with or prior to such premetallized 1:1 dye:chromium complexes, the neutral dyeing acid nylon dyes are preferred because of their superiority with respect to ease of application, levelness of dyeing obtained, controllable rate of exhaustion, and excellent build-up of shade to required heavy depths. Other acid dye types mentioned above when used in combination with the premetallized 1:1 dye-chromium complexes are generally inferior in one or more of these areas. For example, acid dyeing acid dyes lack sufficient pile-on capability to produce heavy shades; the neutral premetallized 2:1 complex dyes have inferior water solubility and too high a rate of exhaustion; and the acid premetallized dyes (1:1 and 2:1 dye:metal complexes having high water solubility) do not build up to heavy shades any better in combination with other 1:1 complexes than they do alone.

In accordance with this invention, when a neutral dyeing acid nylon dye (which gives excellent pile-on) is used in combination with a water soluble premetallized 1:1 azo dye-chromium complex (which gives excellent washfastness) the combination produces optimum results as to both effects; quite unexpectedly very deep shades of surprisingly excellent washfastness can be obtained. As to washfastness, the properties of the dyeings are better than would be expected from a purely additive standpoint, and the washfastness of the deeper dark shades is better than obtained with expensive conventional after-treatments.

In accordance with this invention, the novel dye compositions can be applied simultaneously from a single bath at a pH of about 4, or the individual components of the dye composition can be applied sequentally from the same bath or sequentially from different dyebaths—in the latter cases, the non-metallized dye component is first applied and thereafter the premetallized dye is applied.

The preferred method of application, however, involves applying the dye compositions made in accordance with the present invention from a substantially neutral dye bath to dye on the acid dye component and then lowering the pH so as to dye on the premetallized dye component. Generally, the nylon fibers are entered into the dye bath. The temperature of the bath is usually then raised to about 100° C. In order to control the exhaustion rate of the acid dye component the dye bath should be at a pH of about 6.5 to 7.5. The time of dyeing will vary somewhat with the exhaust rate of the acid nylon dye component and also with the dyeing characteristics of the fiber. Usually, a half hour to one hour treatment at 100° C. will substantially completely exhaust the acid dye component where the bath pH is about 6.5. Thereafter, the premetallized dye component is dyed onto the fiber by dropping the pH of the dye bath to about 3.5. This can be done by the addition of any compatible acid, however, normally, it is preferred to lower the pH by adding acetic acid thereto. The fibers are then allowed to remain in contact with the dye bath for a sufficient time to dye the premetallized complex onto the fabric in quantitites sufficient to enhance the washfastness of the dyeing to a degree that is greater than can be obtained where the fibers carry comparable quantities of the acid dye component alone.

The following examples will serve to illustrate how the dye compositions of this invention can be prepared and used. In these examples, unless otherwise designated, parts are by weight, temperatures are given in degrees centigrade, percentages are percentages by weight, and five digit parenthetical numbers are taken from the Colour Index–Second Edition and indicate dye structure.

*Example 1*

(A) A dyebath was prepared by dissolving 2.0 parts of C.I. Acid Blue 113 (26360) in 2000 parts of water at pH 6.5. A knitted nylon 66 fabric (100 parts) was entered into the bath which was then heated to 100° and the fabric was moved in the bath for one hour at this temperature. The fabric was then removed from the dyebath, rinsed and dried. Half of this piece was designated as Fabric A and half as Fabric B. Fabric A was reserved for testing purposes.

(B) Fabric B (50 parts) was entered into a second dyebath consisting of 1000 parts of water in which was dissolved 1.0 part of the premetallized 1:1 dye:chromium complex (prepared by chroming under acidic conditions the coupling of 1-diazo-2-naphthol-4-sulfonic acid with 2-naphthol) and 2.5 parts of acetic acid, and having a pH of 3.5. Dyeing was carried out for one hour at 100°, and the fabric was then rinsed in water and dried.

The fabrics from A and B were subjected to Test No. IIIA of AATCC Standard Test Method 61–1962 for Colorfastness to Washing, Domestic and Laundering, Commercial: Accelerated (AATCC Technical Manual 1963 Edition, page B–81). Fabric B gave a much superior test result compared with that of Fabric A—even though the amount of dye on Fabric B was much greater than that on Fabric A.

*Example 2*

A dyebath was prepared by dissolving 1.0 part of C.I. Acid Blue 113 and 1.0 part of the 1:1 chromium complex, prepared by chroming under acidic conditions the coupling of 1-diazo-2-naphthol-4-sulfonic acid with 2-naphthol, in 1000 parts of water at pH 6.5. A knitted nylon 66 fabric (50 parts) was entered into the bath which was then heated to 100°. The fabric was moved in the bath for one hour at this temperature. Acetic acid (2.5 parts) was then added the lower the dyebath pH to 3.5, and dyeing was continued for an additional hour at 100°. After rinsing and drying this fabric, it was tested according to the method mentioned in Example 1. Its wash fastness was comparable to that of Fabric B, and far superior to that of Fabric A. The intensity of the dyeing was equal to that of Fabric B.

*Example 3*

A dyebath was prepared by dissolving 1.0 part of C.I. Acid Blue 113 and 1.0 part of the 1:1 dye:chromium complex, prepared by chroming under acidic conditions the coupling of 1-diazo-2-naphthol-4-sulfonic acid with 2-naphthol, in 1000 parts of water. The pH of the dyebath was adjusted to 3.5 by the addition of 2.5 parts of acetic acid. Then a knitted nylon 66 fabric (50 parts) was entered into the bath and the temperature was raised to 100° and held there for two hours during which the fabric was moved in the bath. The fabric, after rinsing and drying, had very good colorfastness when subjected to the test mentioned in Example 1.

*Examples 4–8*

A series of dyeings on nylon 66 knit fabric (5 parts each) was prepared with conditions of dyeing varied as indicated below. In each example, the dyebath was prepared by dissolving in 150 parts of water 0.1 part of C.I. Acid Blue 113 and 0.15 part of the 1:1 chromium:dye complex prepared from the coupling of 1-diazo-2-naphthol-4-sulfonic acid with 2-naphthol. Dyeing was begun at pH 6.5 and after 30 minutes acetic acid was added to produce the indicated pH in the dyebath. Dyeing was then carried out for one hour lonre, while the pH was maintained at the indicated value. The fabric was rinsed well, dried, and tested for washfastness.

| Example No. | Bath Temperature (deg.) | Bath pH after AcOH added |
|---|---|---|
| 4 | 100 | 3.5 |
| 5 | 90 | 3.5 |
| 6 | 80 | 3.5 |
| 7 | 100 | 4.5 |
| 8 | 100 | 5.5 |

Maximum intensity of the dyeing and best washfastness of the series were obtained in Example 4. The examples using lower temperature of dyeing or higher pH gave poorer results in both respects.

In Examples 4–8 while otherwise proceeding as described, replacement of the indicated 1:1 dye:chromium complex with the 1:1 chromium complex of C.I. Mordant Black 1, which has been further solubilized with tartaric acid (Example 1 of my application Ser. No. 328,051, Dec. 4, 1963) gave similar results.

The examples listed in Tables I and II below give further combinations of dyes which also resulted in dyeings having superior washfastness to that attained with the listed non-metallized acid dyes when dyed alone to produce dyeings having similar intensity. In each example, a dyebath was prepared by dissolving 0.1 part of non-metallized acid dye and 0.15 part of 1:1 dye:chromium complex in 150 parts of water at pH 6.5 to 7.5. A knitted nylon 66 fabric (5 parts) was entered into the bath which was heated to 100°. After thirty minutes acetic acid (0.25 part) was added to lower the pH of the dyebath to 3.5. Dyeing was continued for one hour at 100°. The fabric was rinsed, dried and tested for washfastness.

TABLE I

| Example No. | 1:1 Dye:Chromium Complex | Non-Metallized Acid Dye |
|---|---|---|
| 9 | C.I. Acid Yellow 99 (13900) | C.I. Acid Blue 113 (26360). |
| 10 | C.I. Acid Orange 74 (18745) | Do. |
| 11 | C.I. Acid Red 180 (18736) | Do. |
| 12 | C.I. Acid Red 183 (18800) | Do. |
| 13 | C.I. Acid Red 186 (18810) | Do. |
| 14 | C.I. Acid Red 184 (15685) | Do. |
| 15 | C.I. Acid Violet 56 (16055) | Do. |
| 16 | C.I. Acid Blue 158A (15050) | Do. |
| 17 | C.I. Acid Green 12 (13425) | Do. |
| 18 | do | C.I. Acid Green 25 (61570). |
| 19 | do | C.I. Acid Red 85 (22245). |
| 20 | do | Orange of Example 1 of Patent No. 3,267,089. |

TABLE II

| Example No. | 1:1 Dye:Chromium Complex | | Non-Metallized Acid Dye |
|---|---|---|---|
| | Diazo Component | Coupling Component | |
| 21 | 2-aminophenol-4-sulfonic acid | Acetoacetanilide | C.I. Acid Blue 113 (26360). |
| 22 | do | 1-phenyl-3-methyl-5-pyrazolone | Do. |
| 23 | do | 1-(2-chlorophenyl)-3-methyl-5-pyrazolone | Do. |
| 24 | 2-amino-4-nitro-phenol | 1-(2-chloro-5-sulfo-phenyl)-3-methyl-5-pyrazolone | Do. |
| 25 | 2-aminophenol-4-sulfonic acid | do | Do. |
| 26 | 2-amino-4-nitro-phenol | 1-(4-sulfophenyl)-3-methyl-5-pyrazolone | Do. |
| 27 | 2-amino-4-chloro-phenol-6-sulfonic acid | 1-phenyl-3-methyl-5-pyrazolone | Do. |
| 28 | 2-aminophenol-4-sulfonic acid | 1,3-phenylenediamine | Do. |
| 29 | 2-amino-4-nitro-phenol | 1,3-phenylenediamine-4-sulfonic acid | Do. |
| 30 | 2-aminophenol-4-sulfonic acid | 2-naphthol | Do. |
| 31 | 1-amino-2-naphthol-4-sulfonic acid | Acetoacetanilide | Do. |
| 32 | do | 1-phenyl-3-methyl-5-pyrazolone | Do. |
| 33 | do | 1-(2-chloro-5-sulfo-phenyl)-3-methyl-5-pyrazolone | Do. |
| 34 | do | Resorcinol | Do. |
| 35 | 6-nitro-1-amino-2-naphthol-4-sulfonic acid | 1-phenyl-3-methyl-5-pyrazolone | Do. |
| 36 | do | 2-naphthol | Do. |
| 37 | 2-amino-4-chloro-phenol | 1-naphthol-3-sulfonic acid | C.I. Acid Blue 113 (26360). |
| 38 | 2-amino-4-nitrophenol-6-sulfonic acid | Acetoacet-2-chloroanilide | C.I. Acid Blue 113. |
| 39 | 2-aminophenol-4-sulfonic acid | do | C.I. Acid Yellow 29 (18900). |
| 40 | 1-amino-2-naphthol-4-sulfonic acid | 2-naphthol | C.I. Acid Yellow 38 (25135). |
| 41 | do | do | C.I. Acid Yellow 40 (18950). |
| 42 | do | do | C.I. Acid Yellow 42 (22910). |
| 43 | do | do | C.I. Acid Yellow 44 (23900). |
| 44 | do | do | C.I. Acid Orange 1 (13090). |
| 45 | do | do | C.I. Acid Orange 45 (22195). |
| 46 | do | do | C.I. Acid Orange 51 (26550). |
| 47 | do | do | C.I. Acid Orange 56 (22895). |
| 48 | do | do | C.I. Acid Red 32 (17065). |
| 49 | do | do | C.I. Acid Red 42 (17070). |
| 50 | do | do | C.I. Acid Red 73 (27290). |
| 51 | do | do | C.I. Acid Red 80 (68215). |
| 52 | do | do | C.I. Acid Red 85 (22245). |
| 53 | do | do | C.I. Acid Red 89 (23910). |
| 54 | do | do | C.I. Acid Red 99 (23285). |
| 55 | do | do | C.I. Acid Red 114 (23635). |
| 56 | do | do | C.I. Acid Red 115 (27200). |
| 57 | do | do | C.I. Acid Red 133 (17995). |
| 58 | do | do | C.I. Acid Red 151 (26900). |
| 59 | do | do | |

TABLE II—Continued

| Example No. | 1:1 Dye:Chromium Complex | | Non-Metallized Acid Dye |
|---|---|---|---|
| | Diazo Component | Coupling Component | |
| 60 | ----do---- | ----do---- | C.I. Acid Red 97 (22890). |
| 61 | ----do---- | ----do---- | C.I. Acid Violet 9 (45190). |
| 62 | ----do---- | ----do---- | C.I. Acid Violet 34 (61710). |
| 63 | ----do---- | ----do---- | C.I. Acid Violet 43 (60730). |
| 64 | ----do---- | ----do---- | C.I. Acid Blue 1 (42045). |
| 65 | ----do---- | ----do---- | C.I. Acid Blue 7 (42080). |
| 66 | ----do---- | ----do---- | C.I. Acid Blue 25 (62055). |
| 67 | ----do---- | ----do---- | C.I. Acid Blue 59 (50315). |
| 68 | ----do---- | ----do---- | C.I. Acid Blue 78 (62105). |
| 69 | ----do---- | ----do---- | C.I. Acid Blue 92 (13390). |
| 70 | ----do---- | ----do---- | C.I. Acid Blue 118 (26410). |
| 71 | ----do---- | ----do---- | C.I. Acid Blue 120 (26400). |
| 72 | ----do---- | ----do---- | C.I. Acid Blue 127 (61135). |
| 73 | ----do---- | ----do---- | C.I. Acid Green 9 (42100). |
| 74 | ----do---- | ----do---- | C.I. Acid Green 16 (44025). |
| 75 | ----do---- | ----do---- | C.I. Acid Green 20 (20495). |
| 76 | ----do---- | ----do---- | C.I. Acid Green 25 (61570). |
| 77 | ----do---- | ----do---- | C.I. Acid Black 1 (20470). |
| 78 | ----do---- | ----do---- | C.I. Acid Black 24 (26370). |
| 79 | ----do---- | ----do---- | C.I. Acid Black 26A (27075). |
| 80 | ----do---- | ----do---- | C.I. Acid Black 31 (17580). |
| 81 | Anthranilic Acid | 1-(4-sulfo phenyl)-3-methyl-5-pyrazolone | C.I. Acid Orange 1. |
| 82 | ----do---- | ----do---- | C.I. Acid Blue 113. |
| 83 | ----do---- | 1-(2-chloro-5-sulfo-phenyl)-3-methyl-5-pyrazolone | C.I. Acid Orange 1. |
| 84 | ----do---- | 1-(2,5-dichloro-4-sulfophenyl)-3-methyl-5-pyrazolone. | Do. |
| 85 | ----do---- | 1-(6-sulfo-2-naphthyl)-3-methyl-5-pyrazolone | C.I. Acid Blue 113. |
| 86 | ----do---- | 1-(4-sulfo-1-naphthyl)-3-methyl-5-pyrazolone | Do. |
| 87 | ----do---- | 1-naphthol-4-sulfonic acid | Do. |
| 88 | ----do---- | 2-phenylamino-8-naphthol-6-sulfonic acid | Do. |
| 89 | 6-nitro-1-amino-2-naphthol-4-sulfonic acid | 2-naphthol | Orange of Example 1 of Patent No. 3,267,089. |
| 90 | ----do---- | ----do---- | C.I. Acid Red 97 (22890). |
| 91 | ----do---- | ----do---- | C.I. Acid Red 85 (22245). |
| 92 | ----do---- | ----do---- | C.I. Acid Blue 78 (62105). |
| 93 | ----do---- | ----do---- | C.I. Acid Blue 118 (26410). |
| 94 | ----do---- | ----do---- | C.I. Acid Blue 120 (26400). |
| 95 | ----do---- | ----do---- | C.I. Acid Blue 25 (62055). |
| 96 | ----do---- | ----do---- | C.I. Acid Green 25 (61570). |
| 97 | 1-amino-2-naphthol-4-sulfonic acid | 1-phenyl-3-menthyl-5-pyrazolone | C.I. Acid Red 85 (22245). |
| 98 | ----do---- | ----do---- | C.I. Acid Red 114 (23635). |
| 99 | 2-amino-4-nitrophenol | 1-(4-sulfophenyl)-3-methyl-5-pyrazolone | Orange of Example 1 of Patent No. 3,267,089. |
| 100 | 2-amino-4-nitrophenol | 1-(2-chloro-5-sulfo phenyl)-3-methyl-5-pyrazolone | Orange of Example 1 of Patent No. 3,267,089. |
| 101 | 2-amino-5-nitro phenol | 2-naphthylamine-6-sulfonic acid | C.I. Acid Green 25 (61570). |
| 102 | 1-amino-2-naphthol-4-sulfonic acid | 2-naphthol | C.I. Acid Blue 113 (26360). |

In the following examples, deep dye nylon (a product of the Chemstrand Corporation) was used in place of the nylon 66 used in previous examples. Similar excellent fastness to washing resulted.

In Examples 100, 101, and 102, when the deep dye nylon was replaced by knit fabric made from nylon 6, the resultant dyeings had somewhat better colorfastness to washing than comparable dyeings produced by use of the non-metallized acid dyes alone.

*Example 103*

Chromium complexed dye, containing one atom of chromium for each molecule of monoazo dye, prepared by heating 43.9 parts of the monoazo dye (C.I. Mordant Black 1) of the structure:

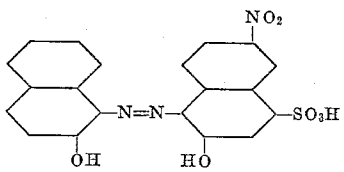

with an equimolar amount of a chromium III salt under acidic conditions according to known methods, was pasted thoroughly in 300 parts of water. The resultant slurry of green, slightly soluble material was heated to 70° and treated with 30 parts of tartaric acid. Then the pH of the slurry was raised in five minutes to 7.5 by addition of 40% sodium hydroxide solution, resulting in complete solution as a reddish-black complex. When solution was complete, the pH was adjusted to 4.5 by addition of hydrochloric acid. The product was isolated by addition of sodium chloride (15% by weight based on the volume), and filtration of the precipitate. After drying, the product was a water-soluble black powder which dyed synthetic polyamide fibers from acid dyebaths.

*Example 104*

In Example 103, while otherwise proceeding as described, the 30 parts of tartaric acid was replaced by 38.4 parts of citric acid. Instead of salting the product from solution, it was isolated by evaporation to dryness. A product similar to that of Example 103 was obtained.

*Example 105*

In Example 103, while otherwise proceeding as described, the 30 parts of tartaric acid was replaced by 25.2 parts of oxalic acid dihydrate. The resultant solution was evaporated to dryness instead of being salted and gave a product very similar to that obtained in Example 103.

*Example 106*

A dyebath was prepared by dissolving 4.0 parts of the dye prepared according to Example 103, 2.0 parts of C.I. Acid Blue 113, and 2.0 parts of the orange dye having the structure:

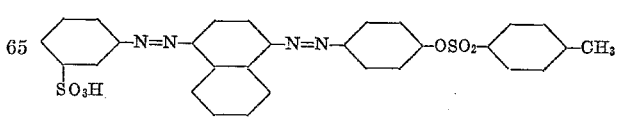

prepared as described in Patent No. 3,267,089, in 2000 parts of water. A knitted nylon 66 fabric (100 parts) was entered into the bath, the bath was heated to 100° and the fabric was moved in the bath for 30 minutes. Then 5 parts of acetic acid was added, and the dyeing was continued for one hour additional time. The resultant dyed fabric had an even dense black color. Standard tests showed the dyed fabric to have excellent fastness to both light and severe washing.

*Example 107*

In Example 106, while otherwise proceeding as described, the 2.0 parts of C.I. Acid Blue 113 was replaced by 2.0 parts of C.L. Acid Blue 120. The resultant dyeing was slightly greener in shade than that of Example 106, but had similar excellent fastness properties.

As disclosed in my copending application, 328,051, the solubilized 1:1 dye-chromium complexes of foregoing Examples 103–105 have unique and highly valuable properties in the dyeing of synthetic polyamide fibers—particularly the nylons. The solubilized complex after drying is a black water-soluble powder which dyes polyamide fibers from acid dyebaths. When used alone the solubilized 1:1 complex imparts reddish gray shades to the fibers with an excellent degree of washfastness. The solubilized 1:1 complex will not exhaust well from the dyebath and therefore cannot be used alone for the production of heavy black dyeings. However, when the solubilized 1:1 complex is applied simultaneously with, or following, conventional non-metallized, non-metallizable acid dyes for polyamides, the degree of exhaustion of the complex is markedly increased and the intensity of the dyeing is increased to a degree that is greater than that expected from the increased exhaustion. The dyeings also exhibit exceptional washing fastness even when the acid dyes used do not alone exhibit good fastness to washing. As shown in Examples 106 and 107, the dyeings obtained from combinations with the solubilized 1:1 complex of this invention have a degree of washfastness approaching that of the complex alone. This new effect is of greatest value in the production of heavy compound shades, such as black, navy, brown, maroon, etc., having washing fastness formerly difficult to obtain using the conventional acid dyes; or even when conventional acid dyes were aftertreated with the usual fixing agents for these dyes. With the heavy compound shades maximum results with respect to washing fastness of dyeings are obtained when the solubilized 1:1 dye-chromium complex is present in a molar excess compared to the other dyes in the combination.

I claim:

1. A composition comprising at least one non-metallized and non-metallizable acid dye that is capable of dyeing nylon fibers from a substantially neutral to weakly acid solution and at least a molecular equivalent of a premetallized azo dye-chromium-complex containing one sulfonic group wherein the dye and chromium are present in a molecular ratio of about 1:1; said premetallized dye is substantially free of dye-metal complexes in which the dye metal ratio is 2:1; and the metallized portion is substantially free of unchromed dye, and is soluble in neutral and weakly alkaline aqueous solutions, and wherein the azo component of the premetallized dye includes groups positioned ortho, ortho' to the azo linkage, one of these vicinal groups being —OH and the other being —OH, —NH₂ or —COOH.

2. A nylon textile wherein the nylon fibers carry a composition according to claim 1, said textile being characterized in that the washfastness of the dyeing is greater than that of a dyeing carrying comparable quantities of the acid dye component alone.

3. The method of dyeing nylon fibers which comprises treating the fibers with an aqueous solution of a composition according to claim 1 for a sufficient time to substantially completely exhaust the acid dye component onto the fibers and to thereafter dye the fibers with a sufficient quantity of the premetallized dye component to produce a dyeing having washfastness that is greater than the washfastness of a dyeing carrying comparable quantities of the acid dye component alone.

4. The method according to claim 3 wherein the pH of the aqueous solution is about 4 at least during that portion of the dyeing operation in which the premetallized dye component is dyed onto the fiber.

5. The method according to claim 4, wherein the dye bath is raised to a temperature of about 90–125° C. after the fibers have been entered into the dye containing solution.

6. The product of the process of claim 3.

7. The method of dyeing nylon fibers which comprises entering the fibers into a first dye bath having a pH of no less than about 6 and containing at least one non-metallized, non-metallizable acid dye that is capable of dyeing nylon at the bath pH, raising the dye bath temperature to about 90–125° C., removing the fibers from the first dye bath after the acid dye component has been substantially completely exhausted onto the fiber, entering the treated fibers into a second dye bath having a pH of about 4 and containing a premetallized azo dye-chromium complex, containing one sulfonic group, said premetallized complex being readily soluble in neutral and weakly alkaline solutions and being characterized in that the chromium and dye are present in a molecular ratio of 1:1 and in that the complex is substantially free of 2:1 dye-metal complex components; and unchromed dye and in that the azo component of the premetallized dye includes groups positioned ortho, ortho' to the azo linkage, one of these vicinal groups being —OH and the other being —OH, —NH₂ or —COOH; raising the bath temperature to about 90–125° C., removing the fibers from the second dye bath, after a sufficient quantity of the premetallized dye component has been dyed on the fiber to produce a dyeing having washfastness that is greater than that of a dyeing carrying comparable quantities of the acid dye component alone, removing excess dye liquor from the fibers and then drying the material.

8. The method of dyeing nylon fibers which comprises entering the fibers into an aqueous substantially neutral dye bath containing a dye composition according to claim 1, raising the temperature of the bath to about 90–125° C., maintaining the fibers in contact with the dye liquor for a sufficient time to substantially completely exhaust the acid dye component onto the fibers, thereafter adjusting the acidity of the dye bath to provide therein a pH of about 4, maintaining the fiber in contact with the dye bath for a sufficient time to enable the fiber to be dyed by the premetallized dye component, removing the fibers from the dye bath, removing excess dye liquor therefrom and then drying the material.

9. A composition according to claim 1 wherein the premetallized azo dye is a 1:1 metal complex azo dye formed from trivalent chromium and a mono azo dye having the structure:

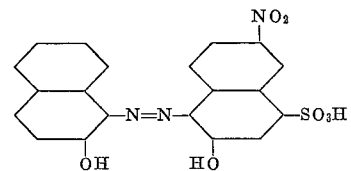

that has been solublized with an acid selected from the group lactic acid, citric acid, oxalic acid, tartaric acid, malic acid, saccharic acid and tartronic acid.

10. A black dye for nylon fibers according to claim 1 wherein the non-metallized and non-metallizable acid dye component comprises an azo acid blue dye and an azo acid orange dye, wherein the premetallized azo dye is a 1:1 metal complex azo dye formed from trivalent chromium and a mono azo dye having the structure:

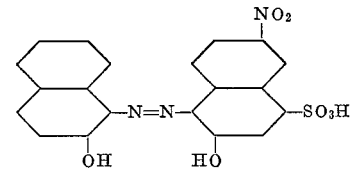

that has been solubilized with an acid selected from the group lactic acid, citric acid, oxalic acid, tartaric acid, malic acid, saccharic acid and tartronic acid, and wherein the molecular concentration of the solubilized complex is at least equal to the combined concentration of the orange and blue components.

11. An aqueous dye bath, for dyeing nylon fibers black, comprising as the dye components: a non-metallizable dye mixture of an azo acid blue dye and an orange dye having the structure:

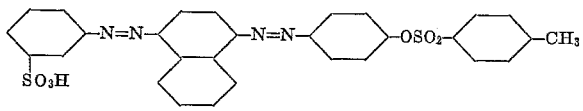

and a premetallized azo dye-chromium-complex formed from C.I. Mordant Black I dye and trivalent chromium, wherein the dye and chromium are present in a molecular ratio of about 1:1 and wherein the complex has been solubilized with tartaric acid; and wherein the molecular concentration of the solubilized complex is at least equal to the combined concentration of the orange and blue dyes.

12. A dye bath according to claim 11 wherein the azo acid blue dye is C.I. Acid Blue 113.

13. A dye bath according to claim 11 wherein the azo acid blue dye is C.I. Acid Blue 120.

References Cited

FOREIGN PATENTS 1,056,581  10/1959  Germany.

NORMAN G. TORCHIN, *Primary Examiner.*

J. HERBERT, *Assistant Examiner.*